(12) United States Patent
Chang

(10) Patent No.: US 8,430,024 B2
(45) Date of Patent: Apr. 30, 2013

(54) FRYING-AND-BAKING OVEN AND HEATING COVER ASSEMBLY THEREOF

(75) Inventor: Kuei-Tang Chang, Banchiau (TW)

(73) Assignee: Tall & Stout Industrial Corp., Shenzhen Guangdong (CN)

(*) Notice: Subject to any disclaimer, the term of this patent is extended or adjusted under 35 U.S.C. 154(b) by 576 days.

(21) Appl. No.: 12/717,895

(22) Filed: Mar. 4, 2010

(65) Prior Publication Data

US 2011/0214574 A1 Sep. 8, 2011

(51) Int. Cl.
*A47J 27/13* (2006.01)

(52) U.S. Cl.
USPC ............... 99/348; 99/409; 219/400; 219/438

(58) Field of Classification Search ............ 99/348, 99/467, 473, 474, 476, 477, 409; 219/393, 219/399, 400, 438, 449.1, 451.1, 452.11, 219/472, 524
See application file for complete search history.

(56) References Cited

U.S. PATENT DOCUMENTS

| | | | | |
|---|---|---|---|---|
| 4,151,792 A | * | 5/1979 | Nearhood | 99/348 |
| 5,980,099 A | * | 11/1999 | Soon | 366/204 |
| 6,747,250 B1 | * | 6/2004 | Cha | 219/400 |
| 2011/0048246 A1 | * | 3/2011 | Chang | 99/348 |

FOREIGN PATENT DOCUMENTS

| DE | 2102062 A1 | 7/1972 |
|---|---|---|
| GB | 2256788 | * 12/1992 |

OTHER PUBLICATIONS

European Search Report.

* cited by examiner

*Primary Examiner* — Benjamin Layno
(74) *Attorney, Agent, or Firm* — Chun-Ming Shih; HDLS IPR Services

(57) ABSTRACT

A frying-and-baking oven includes a baking outer pot, a heating cover assembly covering the outer pot, and a frying inner pot disposed between the outer pot and the heat cover assembly. The heating cover assembly includes a cover, an actuator, a hot-air supplying module, and a speed-reducing mechanism. The actuator has a driving shaft. The hot-air supplying module has an air-blowing impeller and a heating element. The driving shaft drives the air-blowing impeller to blow the hot airflow generated by the heating element. The driving shaft also drives a transmission shaft of the speed-reducing mechanism and in turn a stirring member to rotate at a low speed, thereby stirring food materials in the inner pot. With this arrangement, the food materials received in the inner pot can be stirred automatically and cooked sufficiently. Further, the oven can cook the food materials by baking or frying, which increases the functionality and convenience thereof.

5 Claims, 7 Drawing Sheets

FRYING-AND-BAKING OVEN AND HEATING COVER ASSEMBLY THEREOF

BACKGROUND OF THE INVENTION

1. Field of the Invention

The present invention relates to a frying-and-baking oven, and in particular to a frying-and-baking oven with a heating cover assembly.

2. Description of Prior Art

With the advancement of science and technology, many kinds of novel household appliances are developed to improve the convenience in our daily life. In addition to a microwave oven and a baking oven, a hot-air baking oven is developed, which includes a pot, a cover and a thermoelectric heating module. The interior of the pot is formed with a chamber for receiving food materials. The cover is made of transparent glass through which a user can inspect the baking extent of the food materials in the pot. The thermoelectric heating module is fixedly connected onto the cover. The thermoelectric heating module generates high-temperature airflow and blows the hot air into the pot to bake the food materials.

However, in practice, the above hot-air baking oven still has some problems. When the user intends to bake small-sized food materials such as potato strips, since the potato strips are overlapped with each other in the pot, if the potato strips are not stirred sufficiently during the baking, only some potato strips that are located outside can be baked completely by the hot airflow, while the other potato strips that are located inside cannot be baked completely because the hot airflow is blocked by the outside potato strips. Thus, the user has to stir the potato strips periodically to make all of the potato strips to be baked sufficiently. However, such a stirring operation is not convenient. If the conventional hot-air baking oven has a function of stirring the food materials when baking, the practicability of the baking oven can be enhanced.

On the other hand, it is well known that there are many ways of cooking food materials (such as steam, boil, sauté, fry, bake or the like). In addition to the hot-air baking, the above-mentioned small-sized food materials (such as the potato strips) can be also fried by a little amount of oil. Thus, if an oven can provide two cooking ways (such as frying and baking) rather than only one function, the functionality and convenience of the oven can be increased.

In view of the above problems, the present Inventor proposes a novel and reasonable structure based on his expert experience and deliberate researches.

SUMMARY OF THE INVENTION

The present invention is to additionally provide a frying-and-baking oven and a heating cover assembly thereof. Not only the food materials in the oven can be stirred and baked completely, but also two cooking ways (frying and baking) can be chosen freely by the user.

The present invention is to provide a heating cover assembly for frying-and-baking oven, which includes: a cover; an actuator mounted in the cover, the actuator having a driving shaft; a hot-air supplying module provided below the actuator, the hot-air supplying module comprising a partitioning disk connected to the cover, a heating element fixed below the partitioning disk, and an air-blowing impeller located at the periphery of the heating element and rotatably driven by the driving shaft; and a speed-reducing mechanism provided below the hot-air supplying module, the speed-reducing mechanism comprising a speed-reducing gear set rotatably driven by the driving shaft and a transmission shaft rotatably driven by the speed-reducing gear set.

The present invention provides a frying-and-baking oven, which includes: a baking outer pot having a chamber; a heating cover assembly covering the baking outer pot, the heating cover assembly comprising: a cover; an actuator mounted in the cover, the actuator having a driving shaft; a hot-air supplying module provided below the actuator, the hot-air supplying module comprising a partitioning disk connected to the cover, a heating element fixed below the partitioning disk, and an air-blowing impeller located at the periphery of the heating element and rotatably driven by the driving shaft; and a speed-reducing mechanism provided below the hot-air supplying module, the speed-reducing mechanism comprising a speed-reducing gear set rotatably driven by the driving shaft and a transmission shaft rotatably driven by the speed-reducing gear set; and a frying inner pot disposed between the baking outer pot and the heating cover assembly, the frying inner pot comprising a pot body, and a stirring member disposed in the pot body and rotatably driven by the transmission shaft.

In comparison with prior art, the present invention has advantageous features as follows:

Since the heating cover assembly has the speed-reducing mechanism, when the actuator rotates to drive the air-blowing impeller to blow a hot airflow, the transmission shaft of the speed-reducing mechanism can drive the stirring member to rotate at a low speed, thereby stirring the small-sized food materials received in the frying inner pot. Thus, the small-sized food materials received in the frying inner pot can be stirred uniformly and cooked completely. In other words, the present invention can stir the food materials automatically, so that the user needs not to stir the food materials manually, which increases the convenience of the present invention.

The present invention has a baking outer pot and a frying inner pot. A large-sized food material can be disposed in the baking outer pot and baked by the hot airflow directly. The small-sized food materials can be disposed in the frying inner pot. With a little amount of oil and the hot airflow, the small-sized food materials can be fried completely by the stirring action of the stirring member. Thus, the present invention has dual functions (frying and baking), which greatly increases its functionality and convenience.

DETAILED DESCRIPTION OF THE INVENTION

The characteristics and technical contents of the present invention will be described with reference to the accompanying drawings. However, the drawings are illustrative only, but not used to limit the present invention.

Figure 1:
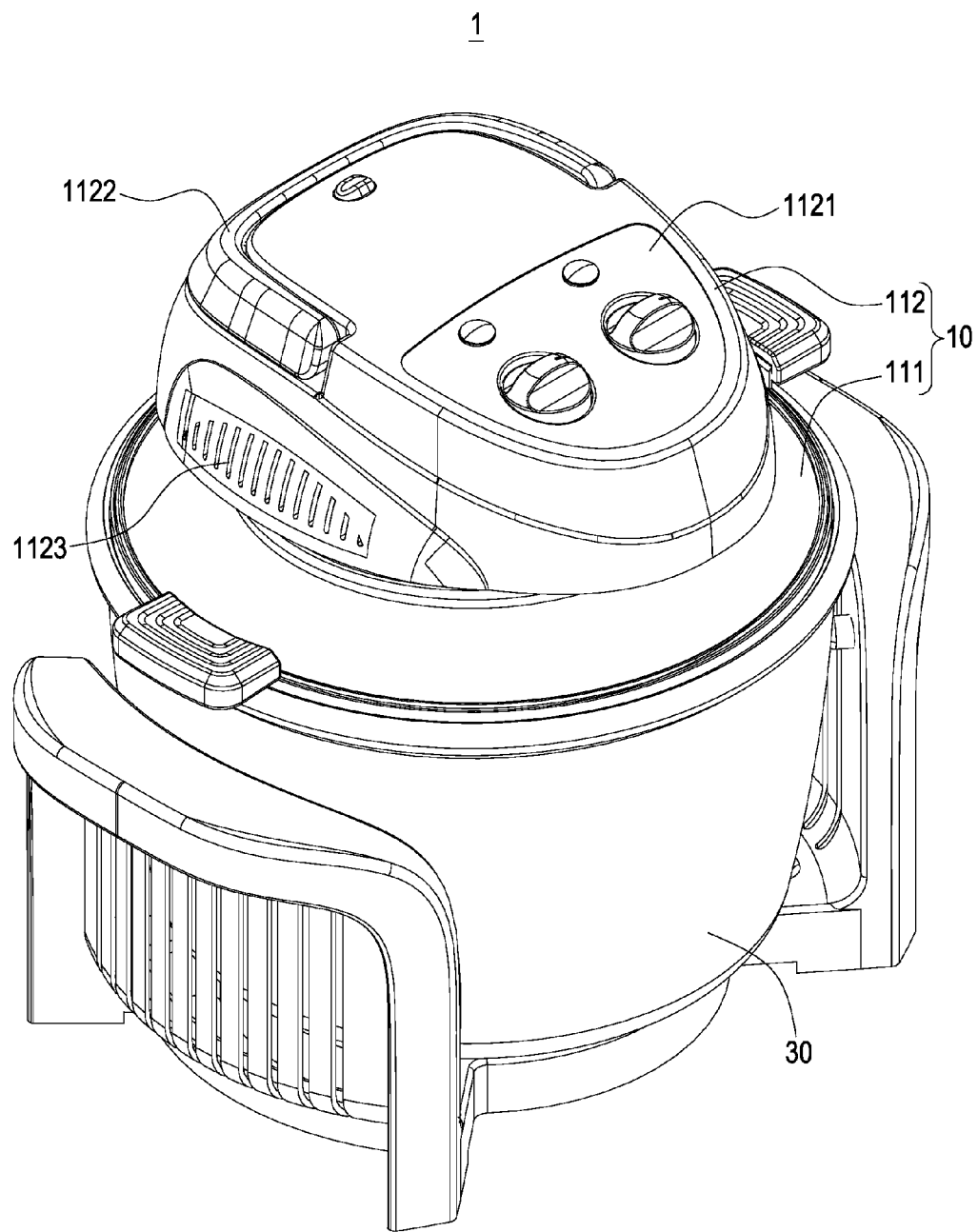
FIG. 1 is an assembled perspective view of the present invention.
Figure 2:
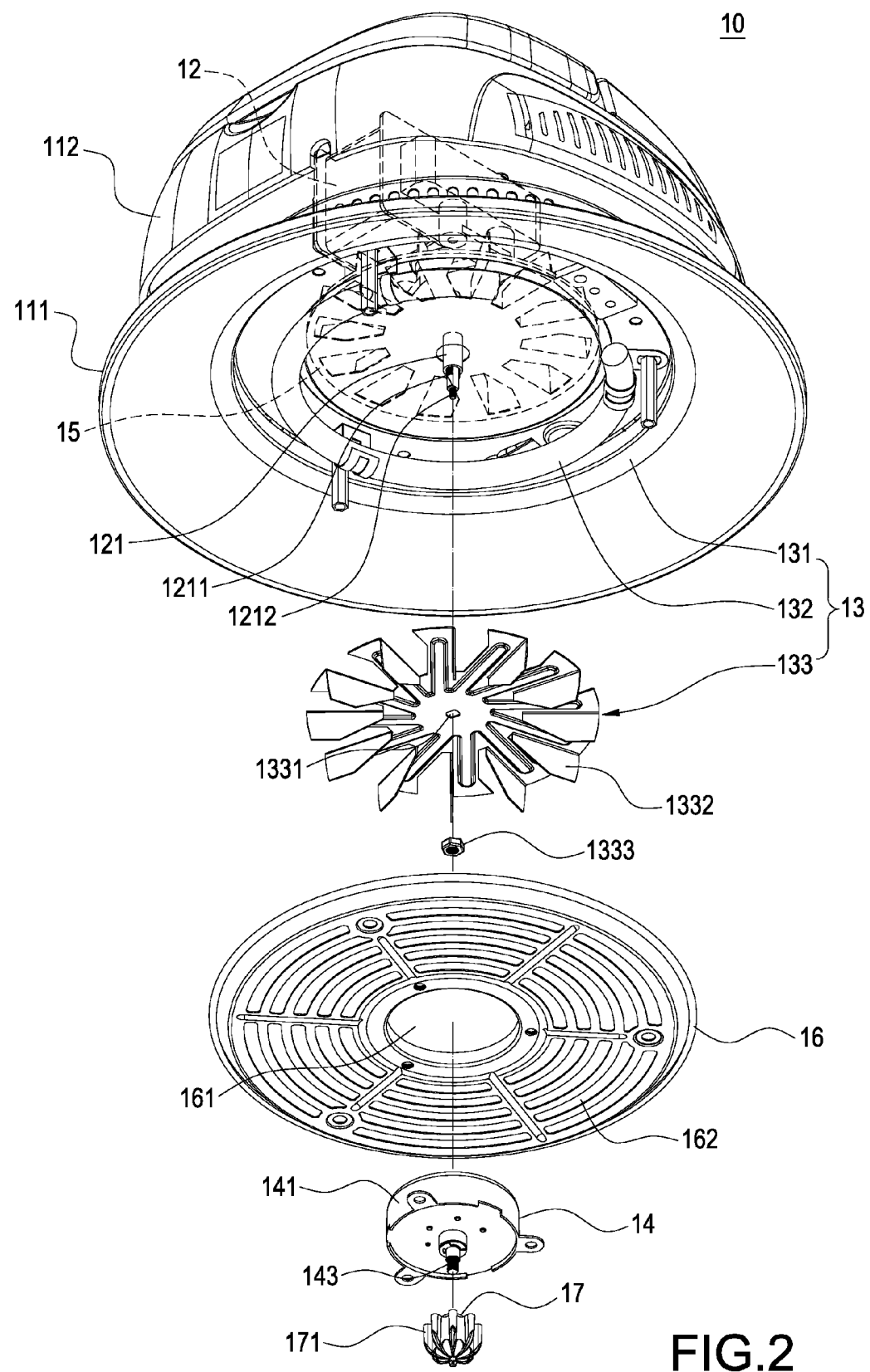
FIG. 2 is an exploded perspective view showing the heating cover assembly of the present invention.
Figure 3:
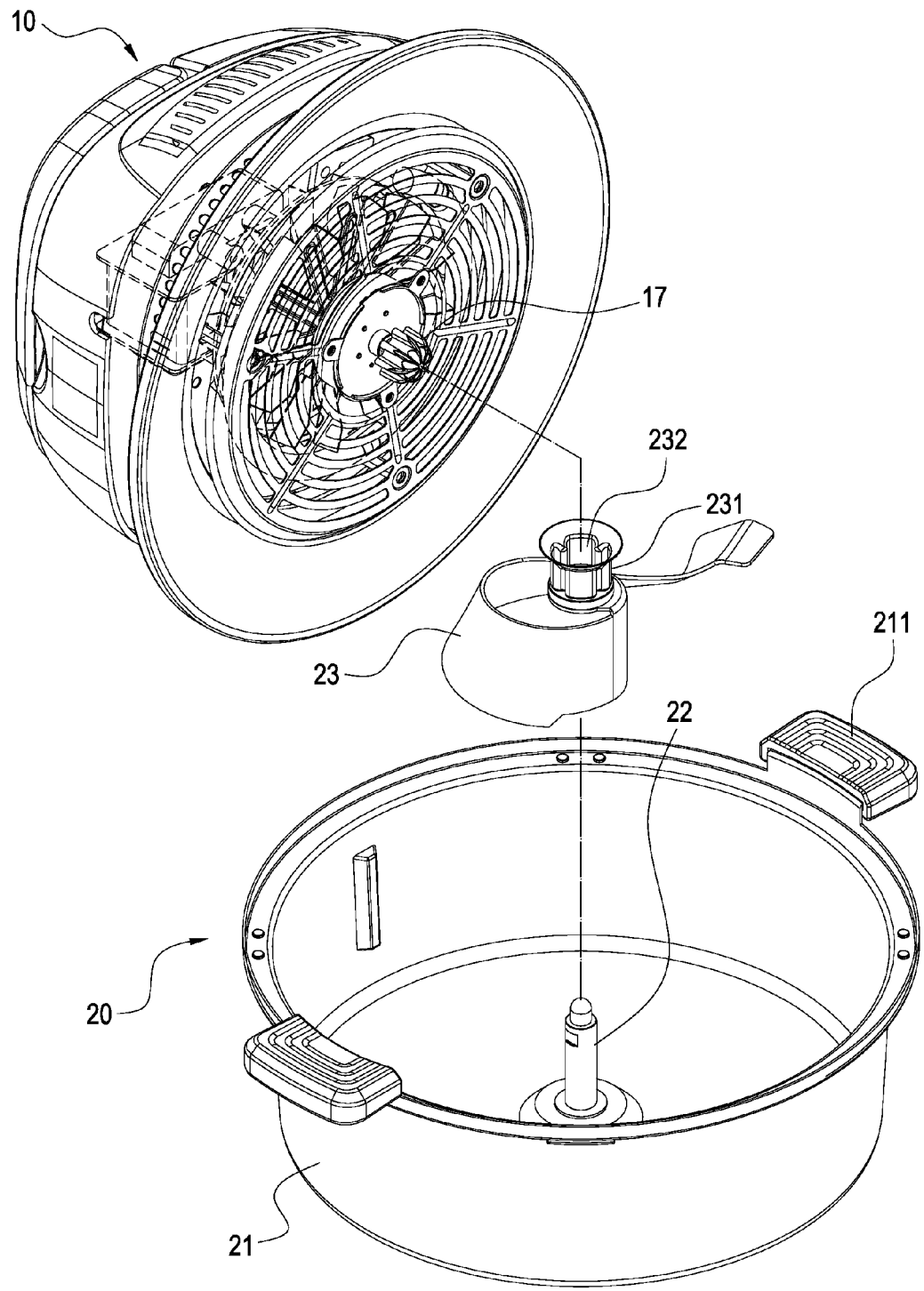
FIG. 3 is an exploded perspective view showing the heating cover assembly and the frying inner pot of the present invention.
Figure 4:
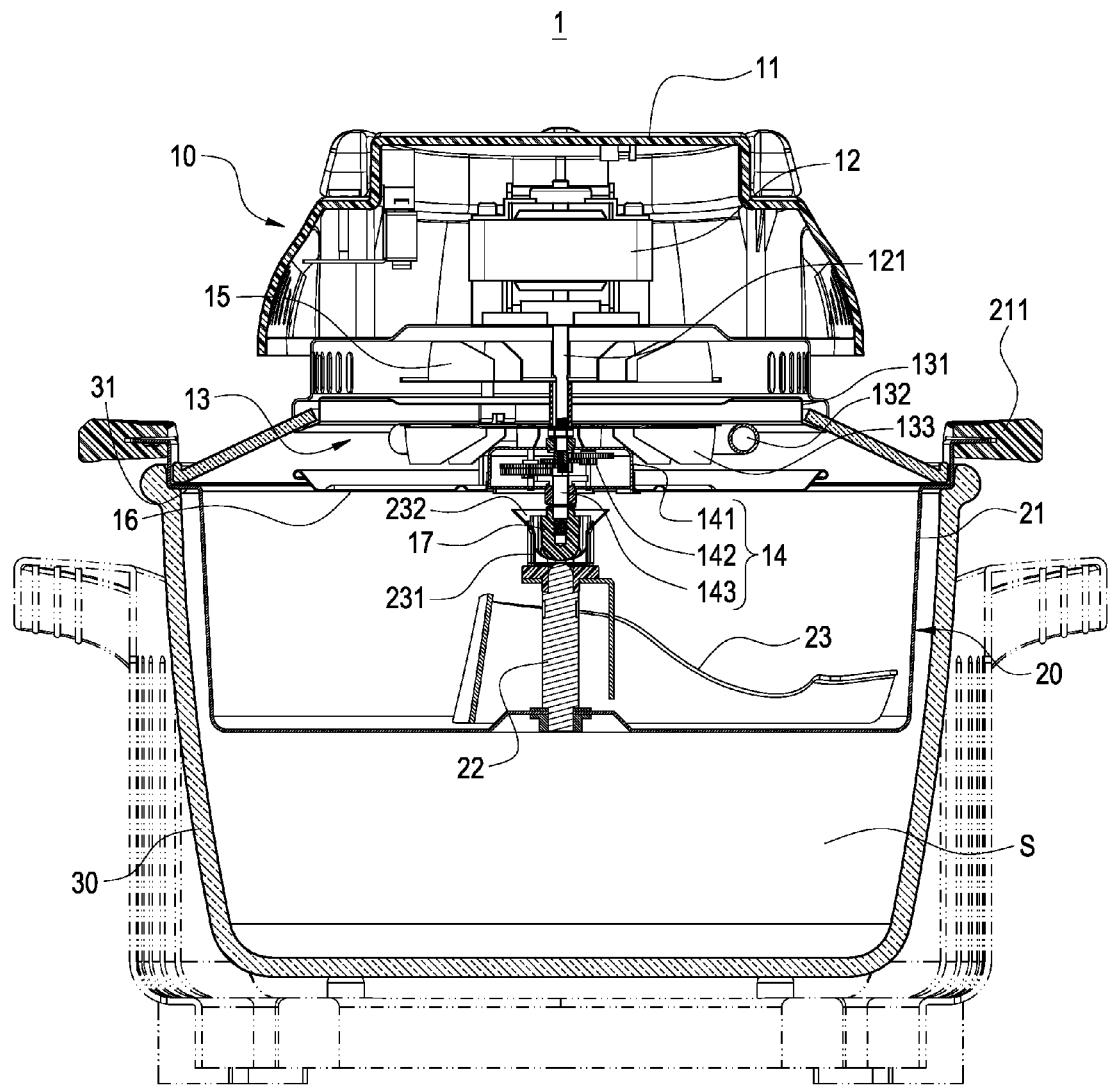
FIG. 4 is an assembled cross-sectional view of FIG. 3.

Please refer to FIGS. 1 to 4. The present invention provides a frying-and-baking oven and a heating cover assembly thereof. The frying-and-baking oven 1 includes a heating cover assembly 10, a frying inner pot 20 and a baking outer pot 30. FIG. 1 is the assembled perspective view of the frying-and-baking oven 1, and FIG. 4 is the assembled cross-sectional view thereof.

As shown in FIGS. 1 and 2, the heating cover assembly 10 includes a cover 11, an actuator 12, a hot-air supplying module 13, and a speed-reducing mechanism 14.

The cover 11 is constituted of a plate 111 and an operating portion 112 protruding from the plate 111. The plate 111 is circular and has a central opening. The plate 111 is configured to cover the baking outer pot 30 (FIG. 4). The operating portion 112 is a hollow cylinder. The upper surface of the operating portion 112 is provided with an operating panel 1121 and a grip 1122 (FIG. 1). The operating panel 1121 has a plurality of buttons for setting and controlling the cooking temperature and the heating period of the frying-and-baking oven 1. The user can hold the grip 1122 to lift up the heating cover assembly 10 or cover the heating cover assembly 10 on the baking outer pot 30. The operating portion 112 is provided with a plurality of heat-dissipating holes 1123 in the periphery of the plate 111. The interior of the cover 11 is provided with a heat-dissipating impeller 15 (FIG. 4) for dissipating the heat generated by the actuator 12 in the operating portion 112 to the outside of the cover 11, thereby keeping the working temperature of the actuator 12 in a normal range.

The actuator 12 is mounted in the cover 11. More specifically, the actuator 12 is mounted in the operating portion 112 of the cover 11. In the present embodiment, the actuator 12 is a motor. The actuator 12 has a driving shaft 121 protruding toward the plate 111. The middle section of the driving shaft 121 is provided with a pair of stoppers and an outer thread 121. The free end of the driving shaft 121 is formed with a driving key 1212 of a reduced diameter. The driving key 1212 has a positioning section (not shown) for positioning and driving the connected speed-reducing mechanism 14.

The hot-air supplying module 13 is provided below the actuator 12. The hot-air supplying module 13 comprises a partitioning disk 131 connected to the cover 11, a heating element 132 fixed below the partitioning disk 131, and an air-blowing impeller 133 located in the periphery of the heating element 132 and rotatably driven by the driving shaft 121.

The partitioning disk 131 is locked to the inner edge of the plate 111 of the cover 11 by means of screws. The center of the partitioning disk 131 has a through-hole for allowing the driving shaft 121 to pass through. The partitioning disk 131 separates the hot-air supplying module 13 from the interior of the cover 11 completely, thereby preventing the oil or vapor generated during the frying or baking operation of the oven 1 from being accumulated in the cover 11.

The heating element 132 is fixed below the partitioning disk 131. In the present embodiment, the heating element 132 is a halogen heater shaped as a ring corresponding to the profile of the partitioning disk 131. The halogen heater can be heated up rapidly and consumes less electricity than the conventional thermoelectric heater. The photo-thermal energy generated by the halogen heater can be transferred by three ways including heat convection, heat conduction and heat penetration, so that the oil applied onto the surfaces of the food materials can be heated up to a high temperature rapidly. The photo-thermal energy can penetrate the surfaces of the food materials to cook the food materials. Further, the surface of the partitioning disk 131 can be treated to reflect the photo-thermal energy generated by the heating element 132, thereby using the thermal energy generated by the heating element 132 sufficiently. Of course, the heat element 132 of the present invention is not limited thereto, and the thermoelectric heater may be used.

The air-blowing impeller 133 has a central through-hole 1331 and a plurality of blades 1332 extending outwardly and radially from the central through-hole 1331. The driving shaft 121 penetrates the central through-hole 1331 of the air-blowing impeller 133 until abutting the stoppers. Then, a locking nut 1333 is threadedly engaged with the outer thread 1211 in the middle section of the driving shaft 121. In this way, the air-blowing impeller 133 can be fixed to the driving shaft 121 to rotate synchronously with the driving shaft 121.

As shown in FIG. 4, the speed-reducing mechanism 14 comprises a casing 141, a speed-reducing gear set 142 located in the casing 141 and rotatably driven by the driving shaft 121, and a transmission shaft 143 rotatably driven by the speed-reducing gear set 142. The upper surface of the casing 141 is provided with a central hole (not shown) into which the driving shaft 121 is inserted. The driving key 1212 at the distal end of the driving shaft 121 drives the speed-reducing gear set 142 in the casing 141 to rotate. The lower surface of the casing 141 is also provided with a central hole for allowing the transmission shaft 143 to penetrate. The speed-reducing gear set 142 is constituted of a plurality of gears and idle wheels of different diameters. The driving key 1212 of the driving shaft 121 is inserted into a shaft hole of one gear to drive that gear, and the other gear is fixedly connected with the transmission shaft 143. The intermediate idle wheels are connected to respective shafts. With the gear ratio between the respective gears and the idle wheels, the rotating speed of the transmission shaft 143 with respect to that of the driving shaft 121 can be reduced greatly.

A protective plate 16 is configured to cover the underside of the hot-air supplying module 13 for preventing the user from being burned by the heating element 132 accidentally. The protective plate 16 is formed as a disk and has a central hole 161 for allowing the speed-reducing mechanism 14 to penetrate and a plurality of meshes 162 arranged on the surface of the protective plate 16. The photo-thermal energy generated by the heating element 132 and the hot airflow blown by the air-blowing impeller 133 can pass through the meshes 162 to achieve the food materials below the protective plate 16.

Further, the free end of the transmission shaft 143 of the speed-reducing mechanism 14 is additionally assembled with a connecting element 17. As shown in FIG. 2, the connecting element 17 has an inner threaded hole (not shown) threadedly engaged with the transmission shaft 143. The end of the connecting element 17 away from the inner threaded hole is formed with at least one tooth 171.

Please refer to FIGS. 3 and 4, which respectively show the exploded view and the schematic view of the operating state of the heating cover assembly 10 and the frying inner pot 20 according to the present invention 20. As shown in FIG. 4, the baking outer pot 30 is a circular hollow pot, which has a chamber S and an opening 31 formed atop the chamber S.

Figure 7:
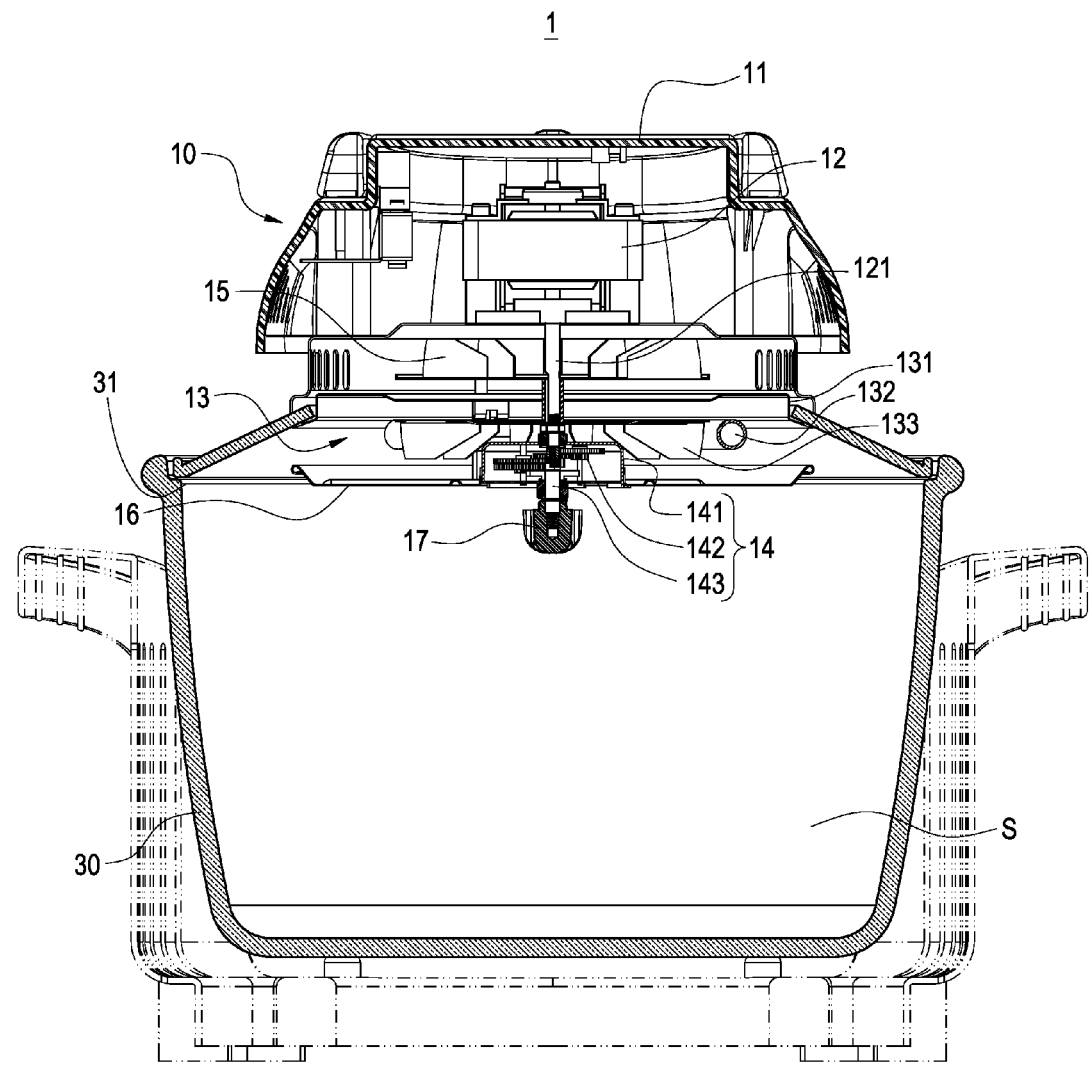
FIG. 7 is an assembled cross-sectional view showing the heating cover assembly and the baking outer pot of the present invention.

In use, the frying inner pot 20 can be selectively disposed between the frying outer pot 30 and the heating cover assembly 10. More specifically, as shown in FIG. 7, if the user intends to bake a large-sized food material, this large-sized food material can be directly disposed in the chamber S of the baking outer pot 30. Then, the user covers the heating cover assembly 10 on the opening 31 of the baking outer pot 30. The hot airflow generated by the hot-air supplying module 13 of the heating cover assembly 10 is used to cook the large-sized food material received in the chamber S of the baking outer pot 30. Therefore, at this time, the frying inner pot 2 is not used.

Further, if the user intends to bake small-sized food materials, the user can put the frying inner pot 20 into the chamber S of the baking outer pot 30 in such a manner that the outer edge of the frying inner pot 20 is supported by the inner edge of the opening 31 of the baking outer pot 30 (FIG. 4). Since the height of the frying inner pot 20 is smaller than that of the baking outer pot 30, the inner space of the frying inner pot 20 is reduced. Thus, the hot airflow generated by the hot-air supplying module 13 can be rapidly circulated in the frying inner pot 20 for cooking the food materials.

As shown in FIG. 3, the frying inner pot 20 is substantially formed into a circular hollow pot, which comprises a pot body 21 and a stirring member disposed in the pot body 21 and rotatably driven by the transmission shaft 143. The stirring member comprises a shaft rod 22 protruding from the bottom surface of the pot body 21 and located to correspond to the transmission shaft 143, and a stirring blade 23 put on the shaft rod 22 and driven by the transmission shaft 143 to rotate with respect to the shaft rod 22. The periphery of the pot body 21 is provided with two handles 211, so that the user can grip the handles 211 to lift up the pot body 21 out of the baking outer pot 30. The bottom surface of the pot body 21 is provided with a shaft rod 22 concentrically arranged with the transmission shaft 143 of the heating cover assembly 10. The center of the stirring blade 23 is provided with a positioning portion 231. The bottom of the stirring blade 23 is provided with a hole into which the shaft rod 22 can be inserted. The upper surface of the stirring blade 23 is provided with a restricting hole 232. The profile of the inner wall of the restricting hole 232 corresponds to that of the tooth 171 of the connecting element 17. With this arrangement, the connecting element 17 can drive the stirring blade 23 to rotate with respect to the shaft rod 22, thereby stirring the food materials received in the pot body 21.

Figure 5:
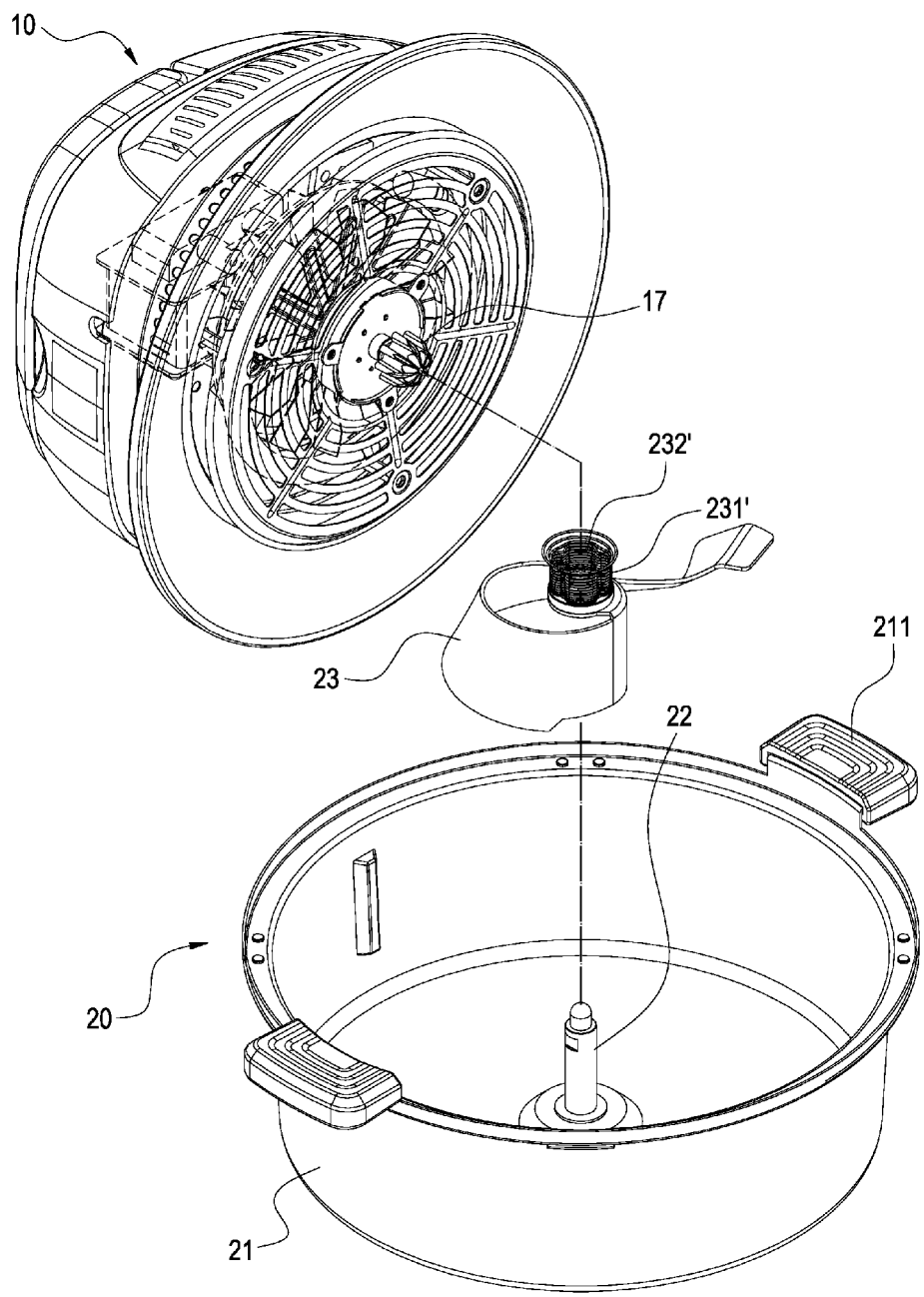
FIG. 5 is another exploded perspective view showing the heating cover assembly and the frying inner pot of the present invention.
Figure 6:
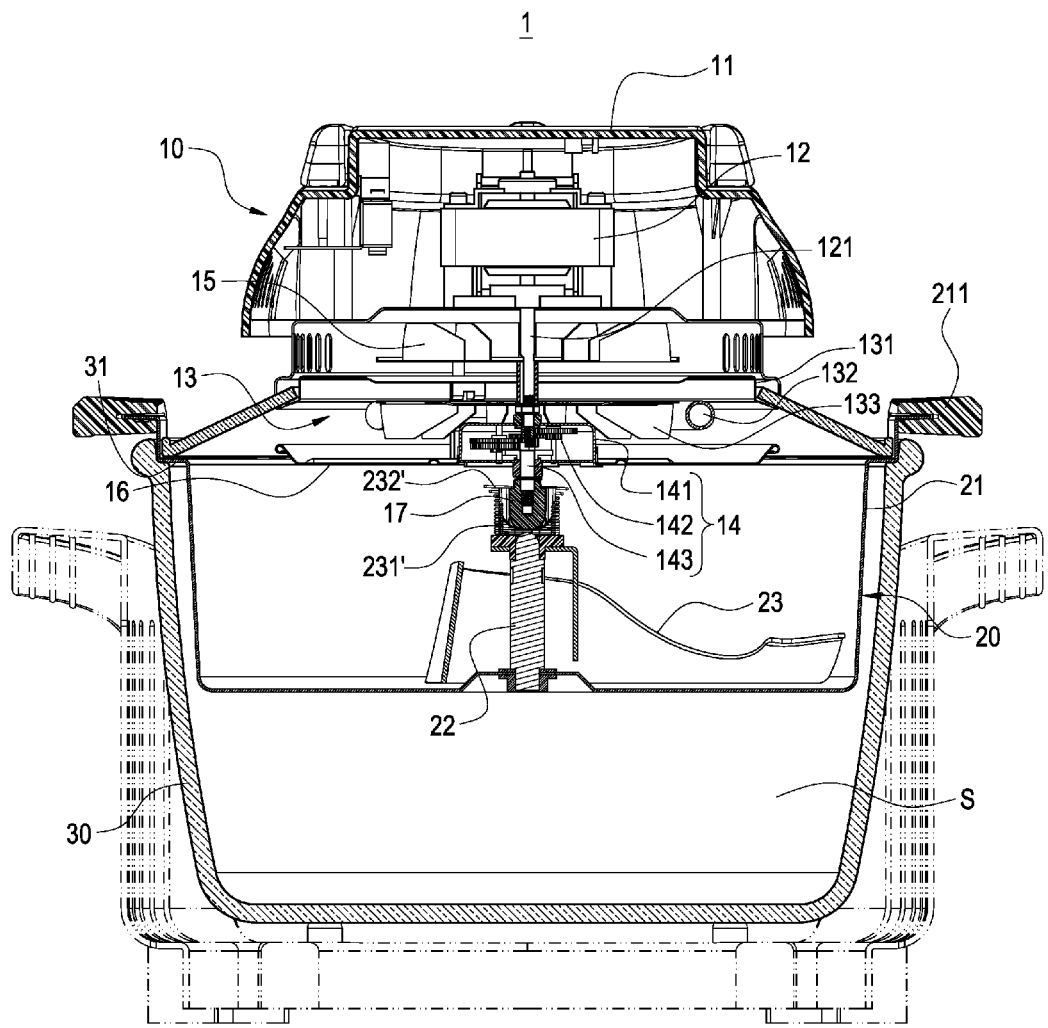
FIG. 6 is an assembled cross-sectional view of FIG. 5.

Please refer to FIGS. 5 and 6. The stirring blade 23 has another form of positioning portion 231. The difference from the previous embodiment lies in that: the positioning portion 231 of the stirring blade 23 as shown in FIG. 3 is a rigid element. Thus, when the connecting element 17 is inserted into the restricting hole 232 of the positioning portion 231 to drive the stirring blade 23 to rotate, the connecting element 17 will collide with the rigid restricting hole 232 to generate a noise. On the contrary, the center of the stirring blade 23 as shown in FIG. 5 is provided with a positioning spring 231'. The bottom of the positioning spring 231' has a hole into which the shaft rod 22 can be inserted. The upper surface of the positioning spring 231' is also provided with a restricting hole 232'. The profile of the inner wall of the restricting hole 232' corresponds to that of the tooth 171 of the connecting element 17. With this arrangement, the connecting element 17 can drive the stirring blade 23 to rotate with respect to the shaft rod 22, thereby stirring the food materials received in the pot body 21. Since the positioning spring 231' has an elastically cushioning effect, the sound generated when the connecting element 17 is collided with the positioning spring 231' can be lowered. In this way, the noise generated during the operation of the frying-and-baking oven 1 can be eliminated Although the present invention has been described with reference to the preferred embodiments thereof, the present invention is not limited thereto. For example, in the above description, the heat-dissipating impeller 15 is provided below the actuator 12. Alternatively, the heat-dissipating impeller 15 may be provided above the actuator 12 to draw the hot air generated by the actuator 12 out of the cover 11. The profile of the stirring blade 23 can be varied to other forms. Further, a plurality of stirring blades 23 can be provided. The connecting element 17 is used to enlarge the contact area with the positioning portion 231 of the stirring blade 23 and increase the torque for rotating the stirring blade 23. Of course, the transmission shaft 143 can directly drive the stirring blade 23 without using the connecting element 17. In this case, the free end of the transmission shaft 143 is formed with a positioning section (not shown), and the stirring blade 23 has a restricting hole (not shown) in which the positioning section is inserted. The stirring blade 23 is detachably assembled with the free end of the transmission shaft 143. Alternatively, the height of the stirring blade 23 may be increased, so that the shaft rod 22 can be omitted. In this case, the stirring member is equivalent to the stirring blade 23, thereby reducing the number of components.

Moreover, although the potato strip is used as an example for the food material in the above description, the frying-and-baking oven 1 of the present invention can be used to cook other small-sized materials, such as beams, corn grains, ham cubes, potato balls, chicken chips, sausages or the like.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A frying-and-baking oven, including:
   a baking outer pot having a chamber;
   a heating cover assembly covering the baking outer pot, the heating cover assembly comprising:
   a cover;
   an actuator mounted in the cover, the actuator having a driving shaft;
   a heat-dissipating impeller mounted in the cover, for dissipating the heat generated by the actuator to outside of the cover, thereby keeping a working temperature of the actuator in a normal range;
   a hot-air supplying module provided below the actuator, the hot-air supplying module comprising a partitioning disk connected to the cover, a heating element fixed below the partitioning disk, and an air-blowing impeller located at a periphery of the heating element and rotatably driven by the driving shaft; and
   a speed-reducing mechanism provided below the hot-air supplying module, the speed-reducing mechanism comprising a speed-reducing gear set rotatably driven by the driving shaft and a transmission shaft rotatably driven by the speed-reducing gear set; and
   a frying inner pot disposed between the baking outer pot and the heating cover assembly, the frying inner pot comprising a pot body, and a stirring member disposed in the pot body and rotatably driven by the transmission shaft, wherein the stirring member comprises a shaft rod protruding from a bottom surface of the pot body to correspond to the transmission shaft, and a stirring blade put on the shaft rod and driven by the transmission shaft to rotate with respect to the shaft rod.

2. The frying-and-baking oven according to claim 1, wherein a free end of the transmission shaft is formed with a positioning section, and the stirring blade has a restricting hole for allowing the positioning section to be inserted therein.

3. The frying-and-baking oven according to claim 1, further including a connecting element fixedly connected to the transmission shaft and rotatably driven by the transmission shaft.

4. The frying-and-baking oven according to claim 3, wherein a free end of the transmission shaft is formed with an outer thread, the connecting element has an inner threaded hole threadedly engaged with the outer thread, an end of the connecting element away from the inner thread hole is formed with at least one tooth, and the stirring blade has a restricting hole for allowing the at least one tooth to be inserted therein.

5. The frying-and-baking oven according to claim 3, wherein a free end of the transmission shaft is formed with an outer thread, the connecting element has an inner threaded hole threadedly engaged with the outer thread, an end of the connecting element away from the inner thread hole is formed with at least one tooth, and the stirring blade has a positioning spring for allowing the at least one tooth to be inserted therein.

\* \* \* \* \*